United States Patent

[11] 3,628,968

[72] Inventors Peter P. Noznick
 Evanston;
 Charles W. Tatter, Homewood, both of Ill.
[21] Appl. No. 719,766
[22] Filed Apr. 8, 1968
[45] Patented Dec. 21, 1971
[73] Assignee Beatrice Foods Co.
 Chicago, Ill.
 Continuation-in-part of application Ser. No. 344,825, Feb. 14, 1964, now abandoned,
 Continuation of application Ser. No. 356,058, Mar. 31, 1964, now abandoned.
 This application Apr. 8, 1968, Ser. No. 719,766

[54] SPRAY-DRIED WHIPPABLE FOOD COMPOSITION
 8 Claims, No Drawings
[52] U.S. Cl. ........................................ 99/139, 99/57, 99/136
[51] Int. Cl. ........................................ A23c 21/00
[50] Field of Search ........................................ 99/118, 123, 139, 134, 128, 60, 57, 140

[56] References Cited
 UNITED STATES PATENTS

| | | | |
|---|---|---|---|
| 2,024,356 | 12/1935 | Harris | 99/123 X |
| 2,035,899 | 3/1936 | Kraft | 99/57 X |
| 2,132,436 | 10/1938 | Reynolds et al. | 99/123 UX |
| 2,754,215 | 7/1956 | Evans et al. | 99/140 |
| 2,765,232 | 10/1956 | Rodgers et al. | 99/57 |
| 2,913,342 | 11/1959 | Cameron et al. | 99/139 |

Primary Examiner—A. Louis Monacell
Assistant Examiner—Jeanette M. Hunter
Attorney—Cushman, Darby & Cushman ABSTRACT: A spray-dried whippable food composition prepared of (1) a polyglycerol partial ester of a higher fatty acid, (2) a carbohydrate from the group of starch, dextrin, gums, and sugars and/or a fat and (3) acid whey.

SPRAY-DRIED WHIPPABLE FOOD COMPOSITION

This application is a continuation of Ser. No. 356,058, filed Mar. 31, 1964; now abandoned, which in turn is a continuation-in-part of application Ser. No. 344,825, now abandoned, filed Feb. 14, 1964.

The present invention relates to emulsified mixtures of essential oils or acid whey.

It is an object of the present invention to prepare novel stable aqueous emulsions of essential oils or acid whey.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing polyglycerol esters of fatty acids as the emulsifying agents. While polyglycerol esters from diglycerol to triconto (30 glycerol units) glycerol esters of fatty acids can be employed there are preferably employed triglycerol to decaglycerol esters of higher fatty acids, (e.g., containing 12 to 22 carbon atoms in the fatty acid). The most suitable polyglycerol esters are partial esters, i.e., they have one or more free hydroxyl groups and hence have both hydrophilic and lipophilic characteristics.

Examples of suitable polyglycerol esters are triglycerol monostearate, triglycerol monoshortening (triglycerol mono ester of the acids of cottonseed oil), triglycerol monooleate, hexaglycerol monostearate, hexaglycerol monoshortening, hexaglycerol monooleate, hexaglycerol dioleate, hexaglycerol dishortening, hexaglycerol hexaoleate, decaglycerol monostearate, decaglycerol monoshortening, decaglycerol monooleate, decaglycerol monolaurate, decaglycerol tristearate, decaglycerol tri shortening, decaglycerol trioleate, decaglycerol trilinoleate, decaglycerol decastearate, decaglycerol decaoleate, decaglycerol deca linoleate, decaglycerol tetraoleate, diglycerol monostearate, dodecaglycerol hexapalmitate, decaglycerol tripalmitate, decaglycerol di archinate, triglycerol mono behenate, dodecaglycerol tri lignocerate, decaglycerol mono linolenate, hexaglycerol di ricinoleate, decaglycerol deca myristate, decaglycerol tri ester of soybean oil acids, decaglycerol tetra ester of cottonseed oil acids, hexaglycerol mono ester of coconut oil acids, triglycerol mono ester of peanut oil acids, decaglycerol deca ester of corn oil acids, decaglycerol ester deca ester of hydrogenated cottonseed oil acids.

The polyglycerol esters are useful in giving stable emulsions and uniform, nonsticky spray-dried products in three groups of products in which the essential materials are:

I. essential oil, carbohydrate and polyglycerol ester
II. acid whey, fat, colloidal stabilizer and polyglycerol ester
III. acid whey, carbohydrate and polyglycerol ester, with or without fat Conventional additional materials can also be present in the emulsions and spray-dried products.

Unless otherwise indicated, all parts and percentages in the present specification and claims are by weight.

As the carbohydrate there can be used corn syrups with D.E. values of 4 to 70 or higher, molasses, maltose, ribose, galactose, xylose, arabinose, honey, lactose, sucrose, dextrin, water soluble starch, pregelatinized starch, gum arabic, larch gum arabinogalactan (Stractan), d-glucose, modified starches of the types set forth in Schoch U.S. Pat., Ser. No. 2,876,160 e.g., hypochlorite-oxidized cornstarch, torrefaction or roasted dextrins, e.g., canary dextrins, yellow dextrins and British gums having a solubility in cold water of at least 80 percent, thin boiling oxidized starches, e.g., those having a Scott hot paste viscosity of about 45 to 90, etherified starches including hydroxyethyl, hydroxypropyl, methyl and ethyl derivatives having a degree of substitution of 0.04 to 0.25 ether group per glucose unit as well as acid or oxidation modified etherized starches, starch esters, e.g., starch acetate and starch sulfonate, waxy maize starch, waxy sorghum starch, hydroxyethyl torrefaction dextrin, converted starches having a D.E. value of 4 to 20.

Such colloidal carbohydrate stabilizers include cellulose ethers such as methyl cellulose, e.g., Methocel MC (dimethyl ether of cellulose having 1.64–1.92 methoxy groups per glucose unit), mixed methyl hydropropyl cellulose, e.g., Methocel 90 HG (an etherified cellulose having 1.08–1.42 methoxy groups and 0.1–0.3 hydroxypropyl groups per glucose unit) and Methocel 65 HG (an etherified cellulose having 1.61–1.75 methoxy groups and 0.1–0.18 hydroxypropyl groups per glucose unit), carboxymethyl cellulose, low methoxy pectin, i.e., pectin having a methoxyl content of 2.5–4.5 percent, inulin, sugar, Irish moss (carragheen), sodium alginate, gum tragacanth, gum karaya and locust bean gum.

The mixtures are pasteurized in conventional fashion, e.g., at 140°–165° F. for 40–20 minutes, usually 155°–160° F. for 30 minutes. The pasteurization conditions are not critical.

The emulsions are homogenized in conventional fashion to a particle size between >1 to 10 microns. For many uses the particle size of the emulsified material is not over 5 microns although in preparing whipping products the particle size is usually somewhat larger, e.g., 3 to 8 microns.

Homogenization is carried out in conventional fashion at about the pasteurization temperature at pressures which can vary from 100 p.s.i. to 2,000 p.s.i. or somewhat higher. Preferably the homogenization pressure is not over 2,500 p.s.i. and in the examples unless otherwise indicated was 1,500 p.s.i.

The emulsified, homogenized products are spray dried in commercial apparatus to give a particle size of 50 to 200 microns.

The polyglycerol esters have been found to prevent volatiles from going off in clouds and similar essential oil-containing formulations.

The compositions of the present invention are useful as whipping compositions, clouds, etc.

EXAMPLE 1

| | |
|---|---:|
| orange oil (an essential oil) | 19.5 parts |
| decaglycerol tristearate | 0.5 part |
| gum arabic (containing 12% moisture) | 80.0 parts |

This mixture was emulsified at 35 percent solids in water and spray dried to give a product which did not give off as much of the essential oil as products which were spray dried without the polyglycerol ester. Additionally the product made with the polyglycerol ester was not as dusty but more granular and hence recovery was better.

The emulsion prior to spray drying was more stable than conventional orange oil-gum arabic emulsions and hence could be used for a longer period of time before spray drying.

When the decaglycerol tristearate in example 1 was replaced by the same amount of decaglycerol monostearate, a similar spray-dried product was obtained.

In whipping up the spray-dried product ½ cup of whole milk, skim milk or water is placed in a "Mix-master" or other electric mixing machine bowl and 57 grams (2 ounces) of the dry powder are stirred slowly into the liquid in the bowl until thoroughly mixed. The mixing device is operated at high speed until the desired whipped body is reached, usually 2 to 4 minutes. A hand whipping device can also be employed.

In combining the powder with water to make a whippable mix, there can be used from 45 to 85% water with 55 to 15% powder, preferably 35% powder and 65% water. With sweet milk from 60 to 85% milk with 40 to 15% powder, preferably 70% sweet milk and 30% powder are used and with skim milk there can be used 50 to 85% skim milk with 50 to 15% powder, preferably 65% skim milk and 35% powder.

This powder is a very excellent whipping material of good keeping qualities and useful to form a whippable body in many food products, including custards, ice cream, puddings, toppings, fillings and icings, etc., and also can be used as an instant ice cream base. The term fat as used in the present specification and claims includes both liquid and solid fats. Among the suitable edible fats which can be used are cottonseed oil, safflower oil, corn oil, soybean oil, butterfat, coconut oil, peanut oil, lard hydrogenated cottonseed oil, hydrogenated corn oil, hydrogenated soybean oil, hydrogenated peanut oil, olive oil, hydrogenated olive oil, hydrogenated coconut oil, e.g., hydrogenated to a melting point of 92° F.

EXAMPLE 2

| | |
|---|---|
| acid whey solids | 73.5 parts |
| liquid corn oil | 24.5 parts |
| decaglycerol tristearate | 0.5 part |
| Methocel mc. (100 cps. grade) | 0.5 part |

Water was added to give 35 percent solids and the mixture homogenized and spray dried easily.

EXAMPLE 3

| | (a) | (b) |
|---|---|---|
| acid whey | 85.0 parts | 90.0 parts |
| pregelatinized starch | 14.0 parts | 8.0 parts |
| decaglycerol tristearate | 1.0 part | 1.0 part |

Each of examples 3 (a) and 3 (b) was made up to 35 percent total solids in water, homogenized and easily spray dried.

EXAMPLE 4

| | |
|---|---|
| acid whey solids | 75.0 parts |
| dextrine (Globe white) | 19.5 parts |
| lipolyzed butter oil | 5.0 parts |
| decaglycerol tristearate | 0.5 part |

The mixture was made up to 35 percent solids in water, homogenized and easily spray dried. The fact that this product could be easily spray dried was surprising since the homogenized mixture had the high acid pH of 4.38.

We claim:

1. A whippable food composition made from an easily spray driable aqueous mixture and consisting essentially of a spray dried mixture of (1) acid whey, (2) a polyglycerol partial ester of a higher fatty acid and (3) a member of the group consisting of (a) a carbohydrate of the group consisting of modified starch dextrin, sucrose, glucose, maltose, lactose, gum arabic, and larch gum, (b) a mixture of fat and a carbohydrate of group (3) (a), and (c) a mixture of fat and a colloidal carbohydrate stabilizer, said ingredients being employed in amounts sufficient to render the composition whippable upon admixture with water.

2. A composition according to claim 1 wherein the acid whey solids is present in a predominant amount.

3. A composition according to claim 2 wherein the acid whey solids is 73.5 to 90 percent of the total solids.

4. A composition according to claim 3 consisting of the acid whey, the polyglycerol partial ester of a higher fatty acid, a fat and a colloidal carbohydrate stabilizer.

5. A composition according to claim 3 consisting of the acid whey, the polyglycerol partial ester of a higher fatty acid, and pregelatinized starch.

6. A composition according to claim 3 consisting of the acid whey, the polyglycerol partial ester of a higher fatty acid, a fat and dextrin.

7. A composition according to claim 2 wherein the carbohydrate is water soluble starch.

8. A composition according to claim 2 wherein the carbohydrate is modified starch other than water soluble starch.

* * * * *